Patented May 12, 1936

2,040,811

UNITED STATES PATENT OFFICE 2,040,811

FUNGICIDE AND INSECTICIDE

Alexander A. Nikitin and Philip B. Myers, Newark, and James Fowler Adams, Wilmington, Del., assignors to Walter C. O'Kane, Durham, N. H., and Paul Moore, Washington, D. C., as trustees of Crop Protection Institute, an association, Washington, D. C.

No Drawing. Application July 14, 1932, Serial No. 622,572

10 Claims. (Cl. 167—16)

This invention relates to fungicides and insecticides, and more particularly to such compositions containing derivatives of substances capable of base exchange including hydrated silicates, particularly hydrated aluminum silicates, such as the zeolites and particularly the copper derivatives of such compounds.

Among the objects of the present invention is the production of novel fungicides and insecticides, particularly useful against plant fungi and insects, such compositions having zeolites as an effective fungicidal or insecticidal agent, such compositions being utilizable in any desired form including sprays, dusts, dispersions, etc.

Other and further objects and advantages will appear from the more detailed description given below, it being understood, however, that this more detailed description is given by way of illustration only and not by way of limitation, since various changes may be made therein by those skilled in the art without departing from the scope and spirit of the present invention.

The present invention is particularly concerned with fungicides and insecticides containing a heavy metal derivative of a substance capable of base exchange reaction whereby the heavy metal enters into combination. Among the substances thus capable of use there may be mentioned the zeolites or other hydrated silicates, bentonite, soil colloids either organic or inorganic such as green sand, clays, humates, etc.

Thus in the production of fungicides and insecticides in accordance with the present disclosure, hydrated silicates, particularly the hydrated aluminum silicates, such as the zeolites, are employed, as active agents in these compositions. The zeolites as illustrative of an important group of hydrated silicates are for the most part hydrated ortho-, meta-, or poly-silicates of aluminum, although in some cases, such as in the mineral, apophyllite, aluminum may not be present in the compositions. They may be looked upon in general as secondary minerals resulting from the decomposition of such silicates as the feldspars, leucite, nephelite, sodalite, etc.

The copper derivatives of the zeolites illustrate the preferred form of the present invention, and such copper derivatives may be readily produced by base-exchange reaction with a zeolite or hydrated aluminum silicate, and a solution of a soluble copper salt, such as copper sulphate. For example, sodium zeolite is treated with a solution of copper sulphate, and an exchange of the sodium ion in the zeolite with the copper ion takes place to produce the resulting copper zeolite. Copper alumino silicate of the definite formula $CuO.Al_2O_3.3SiO_2$ has thus been produced, although depending on the reacting conditions the pure compound of the given formula may not be obtained.

In lieu of the natural zeolites, the synthetic permutits may be employed in the production of the corresponding copper derivatives. For this purpose, sodium permutit (purchasable on the market as "Decalso"), or the hydrogen permutit (purchasable on the market as "Folin"), or the calcium permutit (purchasable on the market as "Endurite") may be employed.

In the production of the copper derivatives, for example, the zeolite or permutit may be treated with the solution of the copper salt, the treating operation being repeated a sufficient number of times until the concentration or copper content of the resulting zeolite or permutit is secured.

For example 50 parts by weight of each of the stated permutits above was treated several times with a 4% solution of copper sulphate. The copper content of the resulting permutit in the case of the sodium permutit and hydrogen permutit was found to be respectively 8.22% and 4.27%.

Similarly a copper bentonite having a copper content of 1.8-2.1% and a copper colloidal soil having a copper content of 3.8-4.3% were prepared.

Referring again to the copper compounds as illustrative of the derivatives of the hydrated silicates that may be employed in accordance with the present invention, such derivatives may be used directly for insecticidal and fungicidal purposes, or they may desirably be employed in mixtures with other substances, either inert or having additional properties, or desirable values in such utility, in the form of sprays, dusts, dispersions, etc. For example, the copper zeolites may be mixed with the usual inert constituents employed for dusting purposes, and directly applied to the plants, either vegetable or fruit. Or the desired zeolites may be suspended in a suspending medium with or without dispersing agents to produce desirable sprays and dispersions. The concentration of the copper zeolites in these insecticidal and fungicidal preparations need be very slight, as low a concentration as 0.1% on the basis of metallic copper having been found to give extraordinary results in actual tests. The zeolites may be dehydrated for use in the dusting compositions, if desired, but this is in no way essential.

The efficacy of the insecticides and fungicides containing, for example, the copper zeolites is quite exceptional. For example, sprays were made up containing 0.1–2.0% of copper on the basis of metallic copper. And such sprays containing the copper zeolites were tested with spores of the apple scab (the organism being *Venturia inequalis*) and potato blight (the organism being *Macrosporium solani*). In such tests, with the copper zeolite containing sprays, there was little germination of the organism during 72 hours, whereas with the controls run at the same time, without copper content, the average spore germination was about 50 to 60%. The tests were carried out under conditions of saturated moisture at room temperature. The toxicity tests with the copper zeolites therefore showed an exceptionally great fungicidal efficiency. Specifically there was used in carrying out those tests the final spray made from "Decalso" permutit containing .1% of copper; the final spray made from "Folin" permutit containing .1% copper. Copper colloidal soil also showed very good results on the germination of *Macrosporium solani*.

The term base exchange material is used below in the claims to cover such materials as zeolites, clays, humates, bentonite, green sand, etc., which react with soluble copper salts to form copper derivatives of the said materials.

Having thus set forth our invention, we claim:

1. A fungicide or insecticide containing as the active ingredient a copper zeolite having copper present in the base exchangeable portion of the zeolite.

2. A fungicide or insecticide containing as the active ingredient a copper zeolite having copper present in the base exchangeable portion of the zeolite and an inert carrier therefor.

3. A fungicide or insecticide containing as the active ingredient a copper zeolite having copper present in the base exchangeable portion of the zeolite in finely divided condition for application as a dusting composition.

4. A fungicide or insecticide containing a copper compound of a hydrated aluminum silicate.

5. A fungicide or insecticide comprising a suspension of a copper compound of a hydrated aluminum silicate suspended in a dispersion medium.

6. A fungicide or insecticide comprising a suspension of copper zeolite having copper present in the base exchangeable portion of the zeolite in a dispersion medium containing a dispersing agent the copper zeolite being the active ingredient thereof.

7. A fungicide or insecticide containing a copper compound of a hydrated aluminum silicate and an inert carrier therefor, the composition containing approximately 0.1–2.0% of copper.

8. A fungicide or insecticide containing as the active ingredient a copper compound of a base exchange material having copper present in the base exchangeable portion of the base exchange material.

9. The method of treating economic crops to protect them against parasitic fungi which consists in applying thereto a fungicide of a copper zeolite having copper present in the base exchangeable portion of the zeolite.

10. The method of treating economic crops to protect them against parasitic fungi which consists in applying thereto a fungicide of a copper compound of a base exchange material having copper present in the base exchangeable portion of the base exchange material.

ALEXANDER A. NIKITIN.
PHILIP B. MYERS.
JAMES FOWLER ADAMS.